United States Patent
Baker, Jr. et al.

(10) Patent No.: US 11,798,411 B2
(45) Date of Patent: Oct. 24, 2023

(54) SYSTEMS AND METHODS FOR TRANSFORMING HIGH-DEFINITION GEOGRAPHICAL MAP DATA INTO MESSAGES FOR VEHICLE COMMUNICATIONS

(71) Applicant: Verizon Patent and Licensing Inc., Basking Ridge, NJ (US)

(72) Inventors: Thomas M. Baker, Jr., Denver, CO (US); Randall Paul Carver, Granby, CO (US); Chad Hammond, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 177 days.

(21) Appl. No.: 17/443,071

(22) Filed: Jul. 20, 2021

(65) Prior Publication Data

US 2023/0024757 A1   Jan. 26, 2023

(51) Int. Cl.
G08G 1/09 (2006.01)
G08G 1/01 (2006.01)
H04W 4/40 (2018.01)

(52) U.S. Cl.
CPC .......... *G08G 1/094* (2013.01); *G08G 1/0125* (2013.01); *H04W 4/40* (2018.02)

(58) Field of Classification Search
CPC .... G08G 1/094; G08G 1/0125; G08G 1/0133; G08G 1/0141; H04W 4/40; H04W 4/02; H04W 4/90; H04W 4/44
USPC ......................................................... 455/466
See application file for complete search history.

(56) References Cited

U.S. PATENT DOCUMENTS

| | | | |
|---|---|---|---|
| 11,477,620 B2 * | 10/2022 | Kretschmar | H04W 64/00 |
| 2022/0240065 A1 * | 7/2022 | Dorrance | H04W 4/46 |
| 2022/0262245 A1 * | 8/2022 | Kim | G01C 21/32 |
| 2022/0349725 A1 * | 11/2022 | Chreptyk | G01C 21/3881 |
| 2022/0397419 A1 * | 12/2022 | Stenneth | G01C 21/3885 |

* cited by examiner

*Primary Examiner* — Hirdepal Singh (57) ABSTRACT

A device may receive three-dimensional geographical map data for a geographical region associated with a vehicle device of a vehicle and may process the three-dimensional geographical map data, with a data model, to transform the three-dimensional geographical map data into transformed geographical map data with a format that corresponds to a particular standard. The device may generate a message based on the transformed geographical map data and may cause the message to be provided to the vehicle device. The device may perform one or more actions based on the message.

20 Claims, 9 Drawing Sheets

SYSTEMS AND METHODS FOR TRANSFORMING HIGH-DEFINITION GEOGRAPHICAL MAP DATA INTO MESSAGES FOR VEHICLE COMMUNICATIONS

BACKGROUND

The Society of Automotive Engineers (SAE) provides standards associated with vehicles. For example, one particular standard (e.g., SAE J2735) delineates an industry-wide messaging standard to be used for vehicle-to-vehicle (V2V) communications, vehicle-to-infrastructure (V2I) communications, vehicle-to-everything (V2X) communications, and/or the like.

DETAILED DESCRIPTION OF PREFERRED EMBODIMENTS

The following detailed description of example implementations refers to the accompanying drawings. The same reference numbers in different drawings may identify the same or similar elements.

Messages associated with vehicles may include messages sent via V2V communications, V2I communications, V2X communications, and/or the like. One of the messages associated with vehicles may include a geographical map data message that provides information about a road geometry. Currently, a geographical map data message is manually created through a labor-intensive process that utilizes standard definition two-dimensional geographical map data, two-dimensional aerial imagery, an open source tool, and/or the like. Thus, current techniques for generating geographical map data messages waste computing resources (e.g., processing resources, memory resources, communication resources, and/or the like), networking resources, and other resources associated with retrieving the two-dimensional geographical map data and the two-dimensional aerial imagery, generating inaccurate geographical map data messages based on the two-dimensional geographical map data and the two-dimensional aerial imagery, handling traffic, emergency, and legal issues associated with providing the inaccurate geographical map data messages, and/or the like.

Some implementations described herein provide a transformation system that transforms high-definition geographical map data into messages for vehicle communications. For example, the transformation system may receive three-dimensional geographical map data for a geographical region associated with a vehicle device of a vehicle. The transformation system may process the three-dimensional geographical map data, with a data model, to transform the three-dimensional geographical map data into transformed geographical map data with a format that corresponds to a particular standard. The transformation system may generate a message based on the transformed geographical map data and may cause the message to be provided to the vehicle device. The transformation system may perform one or more actions based on the message.

In this way, the transformation system may transform high-definition geographical map data into messages for vehicle communications. The transformation system may iteratively evaluate high-definition geographical map data (e.g., high-definition geographic information system (GIS) three-dimensional data) and may process the results into a geographical map data message (e.g., an SAE J2735 map message) that can then be delivered to a multi-access edge computing (MEC) device associated with a vehicle device (e.g., a telematics device, a global positioning system (GPS) device, a vehicle tracking unit, and/or the like) of a vehicle or via alternate distribution methods. The high-definition geographical map data may include highly discrete datasets with detailed information about lane boundaries, lane speed, lane type, lane intersections, right turn only indications, curb heights and locations, lane dividers, and/or the like. The transformation system may transform geometries and information from various map layers, of the high-definition geographical map data, into a geographical map data message standard format (e.g., a flat message format).

Thus, the transformation system may conserve computing resources, networking resources, and other resources that would have otherwise been consumed by retrieving the two-dimensional geographical map data and the two-dimensional aerial imagery, generating inaccurate geographical map data messages based on the two-dimensional geographical map data and the two-dimensional aerial imagery, handling traffic, emergency, and legal issues associated with providing the inaccurate geographical map data messages, and/or the like.

FIGS. 1A-1E are diagrams of an example 100 associated with transforming high-definition geographical map data into messages for vehicle communications. As shown in FIGS. 1A-1E, example 100 includes a vehicle, a vehicle device 105, an MEC device 110, and a transformation system 115. The vehicle may include a car, a truck, a motorcycle, a bus, a boat, farm equipment, or construction equipment, among other examples. In some examples, the vehicle may include an autonomous vehicle (e.g., with no driver input required), a semiautonomous vehicle (e.g., with some driver input required), or a non-autonomous vehicle (e.g., with complete driver input required). The vehicle, the vehicle device 105, and the MEC device 110 may be located within a geographical region. Further details of the vehicle device 105, the MEC device 110, and the transformation system 115 are provided elsewhere herein.

Figure 1A:
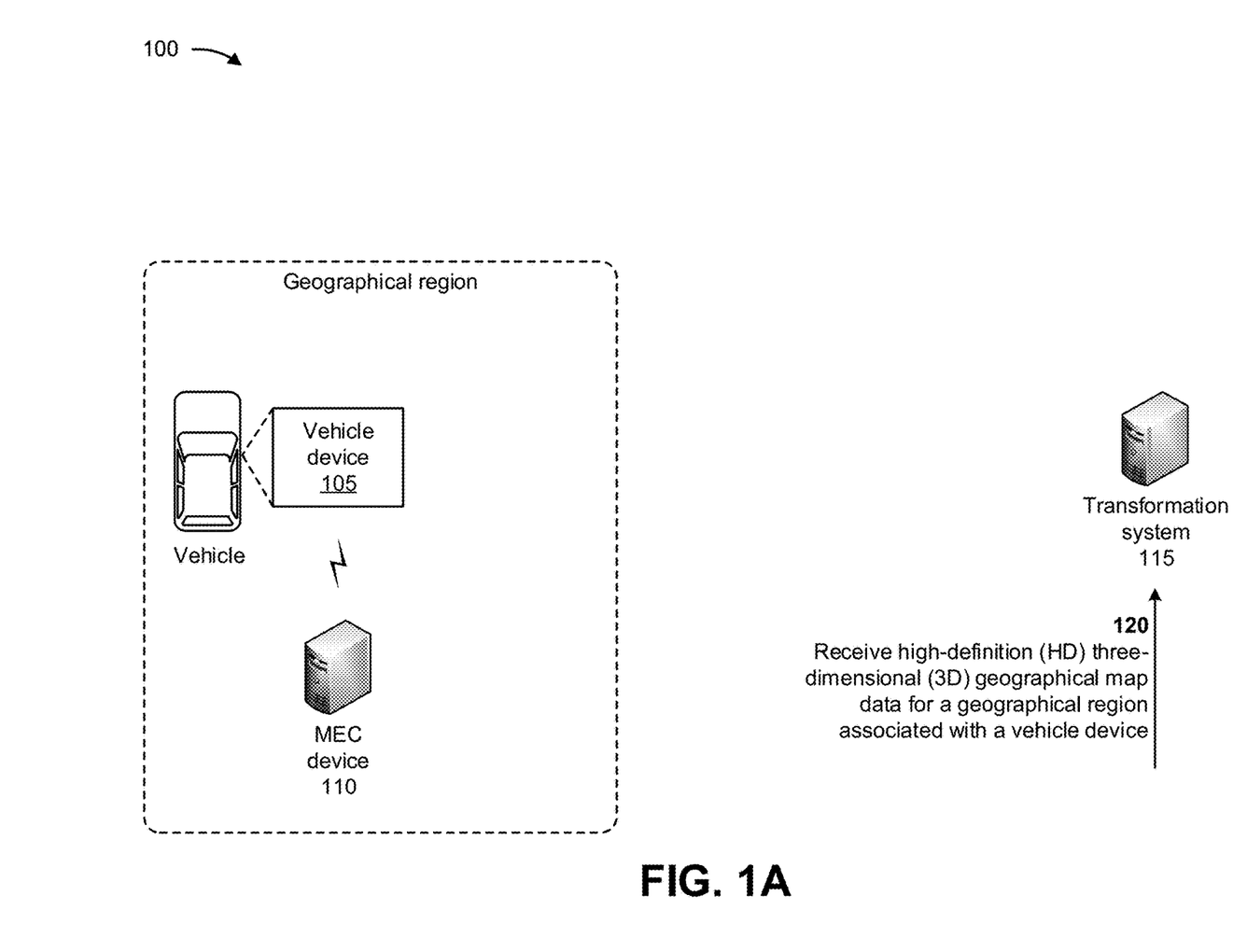
FIGS. 1A-1E are diagrams of an example associated with transforming high-definition geographical map data into messages for vehicle communications.

As shown in FIG. 1A, and by reference number 120, the transformation system 115 may receive high-definition (HD) three-dimensional (3D) geographical map data for the geographical region associated with the vehicle device 105. For example, the transformation system 115 may receive the HD 3D geographical map data from a third-party source, such as a geographic information system (GIS). A GIS is a framework that captures and analyzes spatial and geographic data. A GIS allows users to create interactive queries (e.g., user-created searches), store and edit spatial and non-spatial data, analyze spatial information output, and visually share results of these operations as maps. The HD 3D geographical map data may include highly discrete datasets with detailed information about traffic lane boundaries, traffic lane speeds, traffic lane types, traffic lane intersections, right turn only indications, curb heights and locations, traffic lane dividers, traffic signals, sidewalks, pedestrian lanes, and/or the like associated with the geographical region.

Figure 1B:
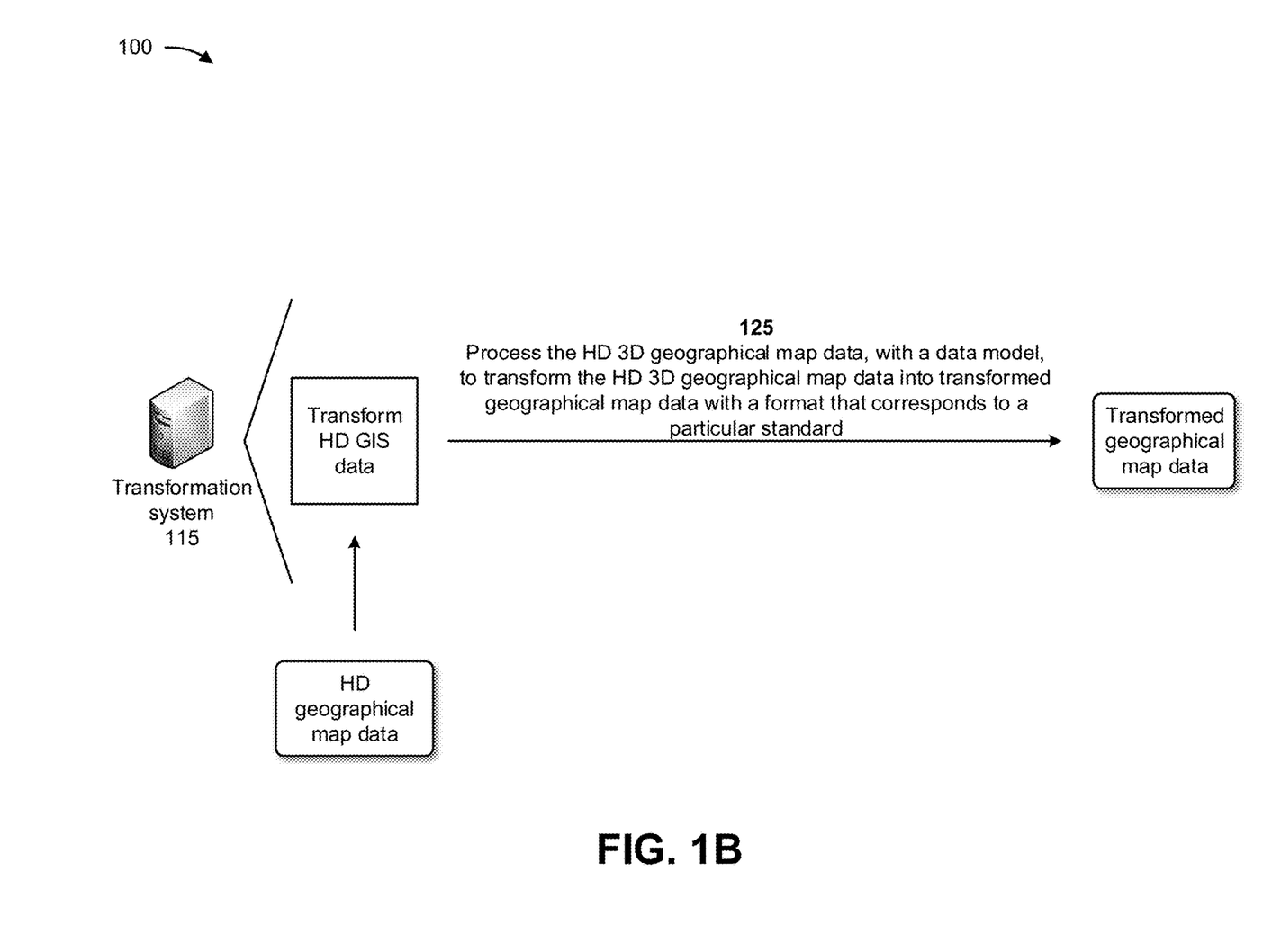

As shown in FIG. 1B, and by reference number 125, the transformation system 115 may process the HD 3D geographical map data, with a data model, to transform the HD 3D geographical map data into transformed geographical map data with a format that corresponds to a particular standard. For example, the format of the transformed geographical map data may correspond to an SAE J2735 standard, a signal, phase, and timing (SPAT) message standard, and/or the like. The transformed geographical map data may include map data identifying one or more traffic lanes, intersections, traffic signals, sidewalks, pedestrian lanes, and/or the like associated with the geographical region.

In some implementations, the transformation system 115 may iteratively process the HD 3D geographical map data, with the data model, to transform the HD 3D geographical map data into the transformed geographical map data. The data model may analyze different layers of the HD 3D geographical map data and may identify a portion (e.g., an intersection, a traffic lane, and/or the like) of the HD 3D geographical map data based on analyzing the different layers of the HD 3D geographical map data. The data model may transform the portion of the HD 3D geographical map data into the transformed geographical map data. For example, the data model may determine how much of the portion (e.g., a roadway) of the HD 3D geographical map data to include in the transformed geographical map data, how to manipulate (e.g., rotate, expand, align, and/or the like) the portion of the HD 3D geographical map data that is included in the transformed geographical map data, and/or the like. In some implementations, the transformation system 115 may transform geometries and information from various map layers, of the HD 3D geographical map data, into a geographical map data message standard format (e.g., a flat message format), such as the SAE J2735 standard format.

In some implementations, the HD 3D geographical data includes at least one GPS coordinate that is in a center of or near an intersection. Using the at least one GPS coordinate, the transformation system 115 may search for and identify the intersection. The transformation system 115 may retrieve the data model for the intersection, a road centerline, and an intersection identifier. Using the intersection identifier, the transformation system 115 may create lane group models and connector models using a parametric position along the road centerline. The lane group connector may include a straight 2D polyline and may be used to indicate either a start or an end of each lane group. A lane group may include one or more lane objects within a span of the road and a boundary geometry. For each lane group, the transformation system 115 may populate each lane object with information that aligns with the standard, such as information identifying a 3D geometry, a direction of travel, a lane type (e.g., a bike lane), a transition type, a width, a speed limit, access characteristics (e.g., temporal conditions on types of traffic allowed lane access), boundary markings, an elevation, a traversal (e.g., a curvature, a heading, a slope, and other information that identifies whether the lane is egress or ingress).

Figure 1C:
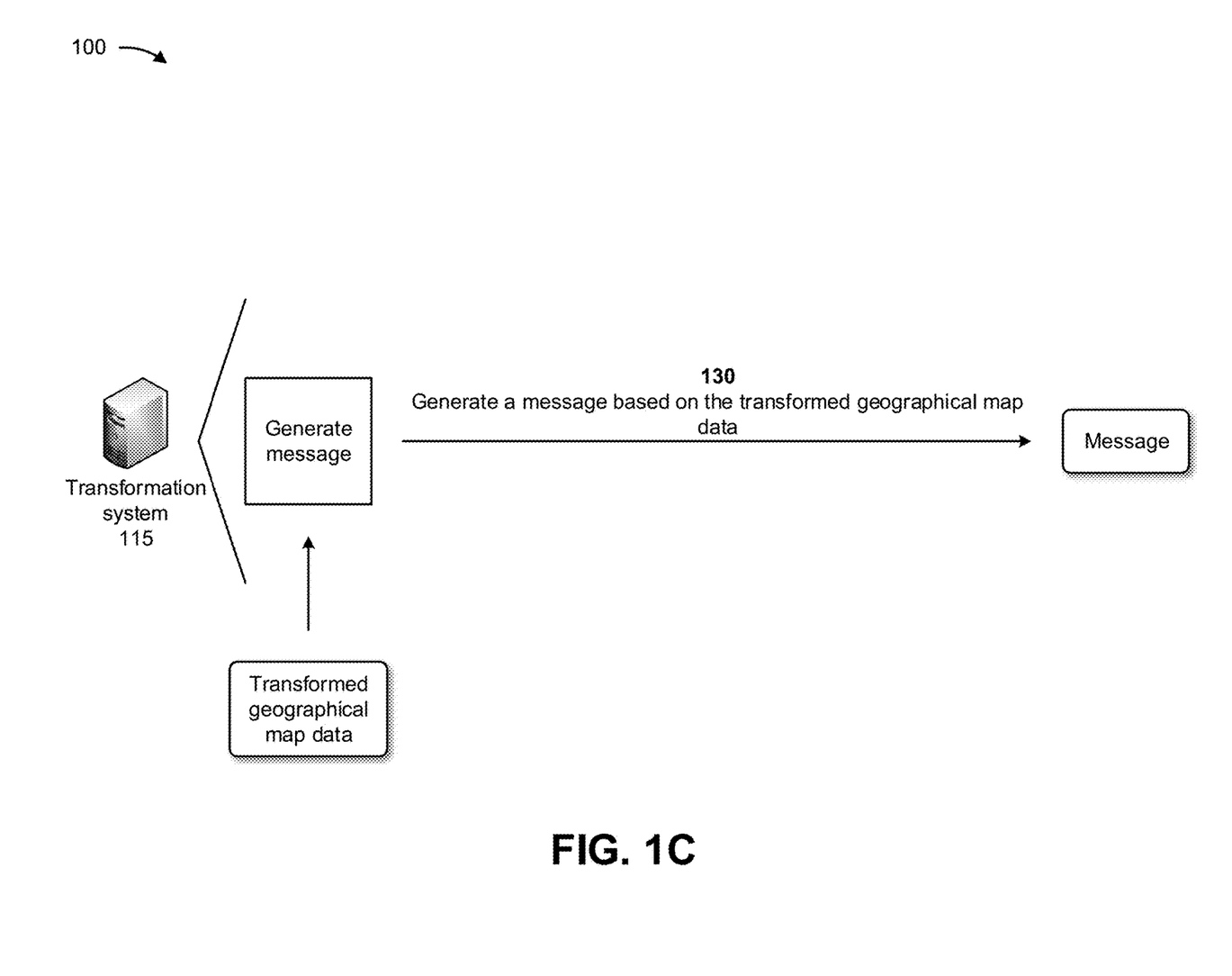

As shown in FIG. 1C, and by reference number 130, the transformation system 115 may generate a message based on the transformed geographical map data. For example, the transformation system 115 may generate a flat message format (e.g., a SAE J2735 standard format, a SPAT format, and/or the like) message based on the transformed geographical map data. The message may include the HD 3D geographical map data but in a format that is understandable by the vehicle device 105, an autonomous robot, a semi-autonomous vehicle, an autonomous vehicle, a non-autonomous vehicle, and/or the like.

Figure 1D:
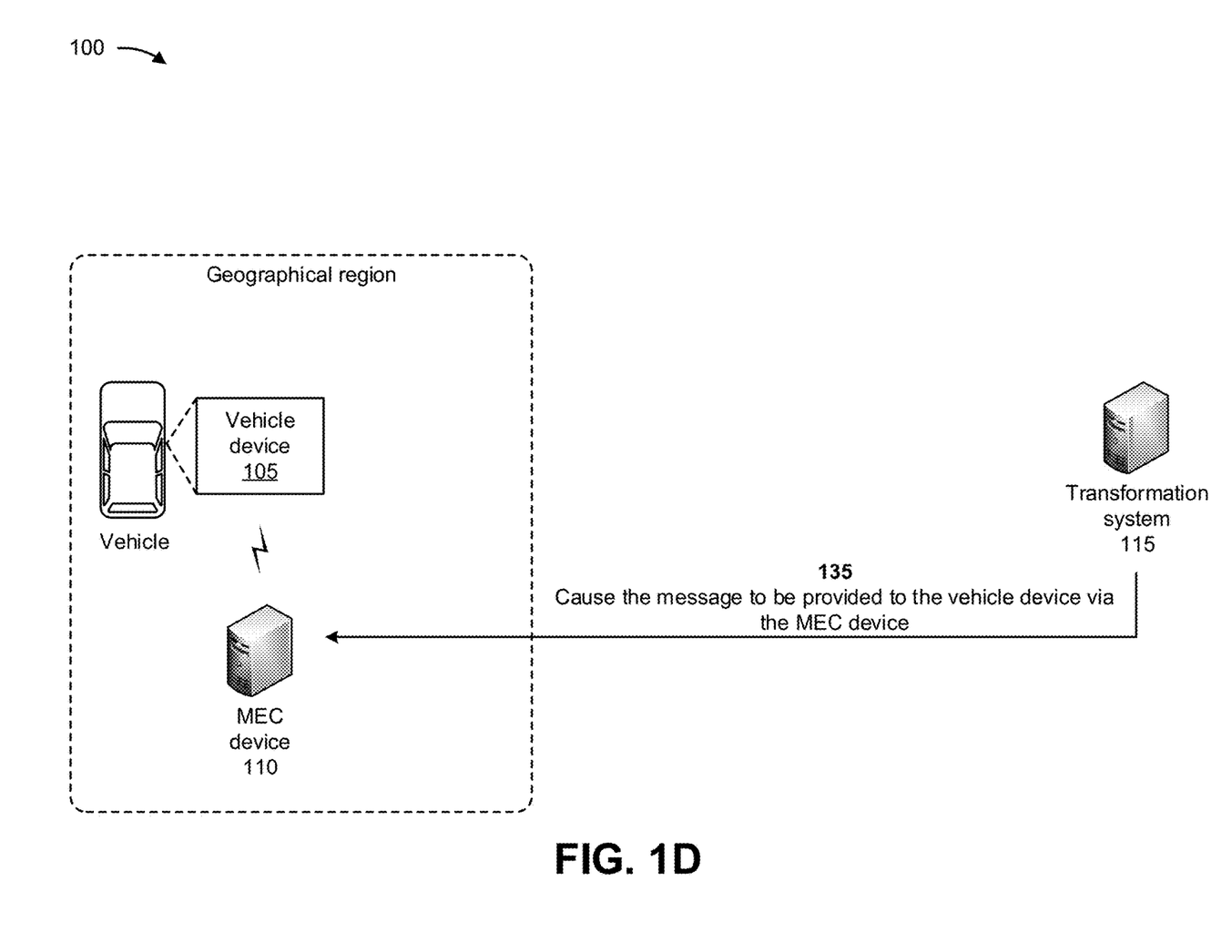

As shown in FIG. 1D, and by reference number 135, the transformation system 115 may cause the message to be provided to the vehicle device 105 via the MEC device 110. For example, the transformation system 115 may provide the message to the MEC device 110 with an instruction to forward the message to the vehicle device 105. The MEC device 110 may receive the message and the instruction and may forward the message to the vehicle device 105 based on the instruction. Alternatively, or additionally, the transformation system 115 may cause the message to be provided to the vehicle device 105 via a registration representational state transfer application program interface (API) associated with a cellular vehicle-to-everything (CV2X) system. Alternatively, or additionally, the transformation system 115 may cause the message to be provided to the vehicle device 105 via a CV2X message broker.

Figure 1E:
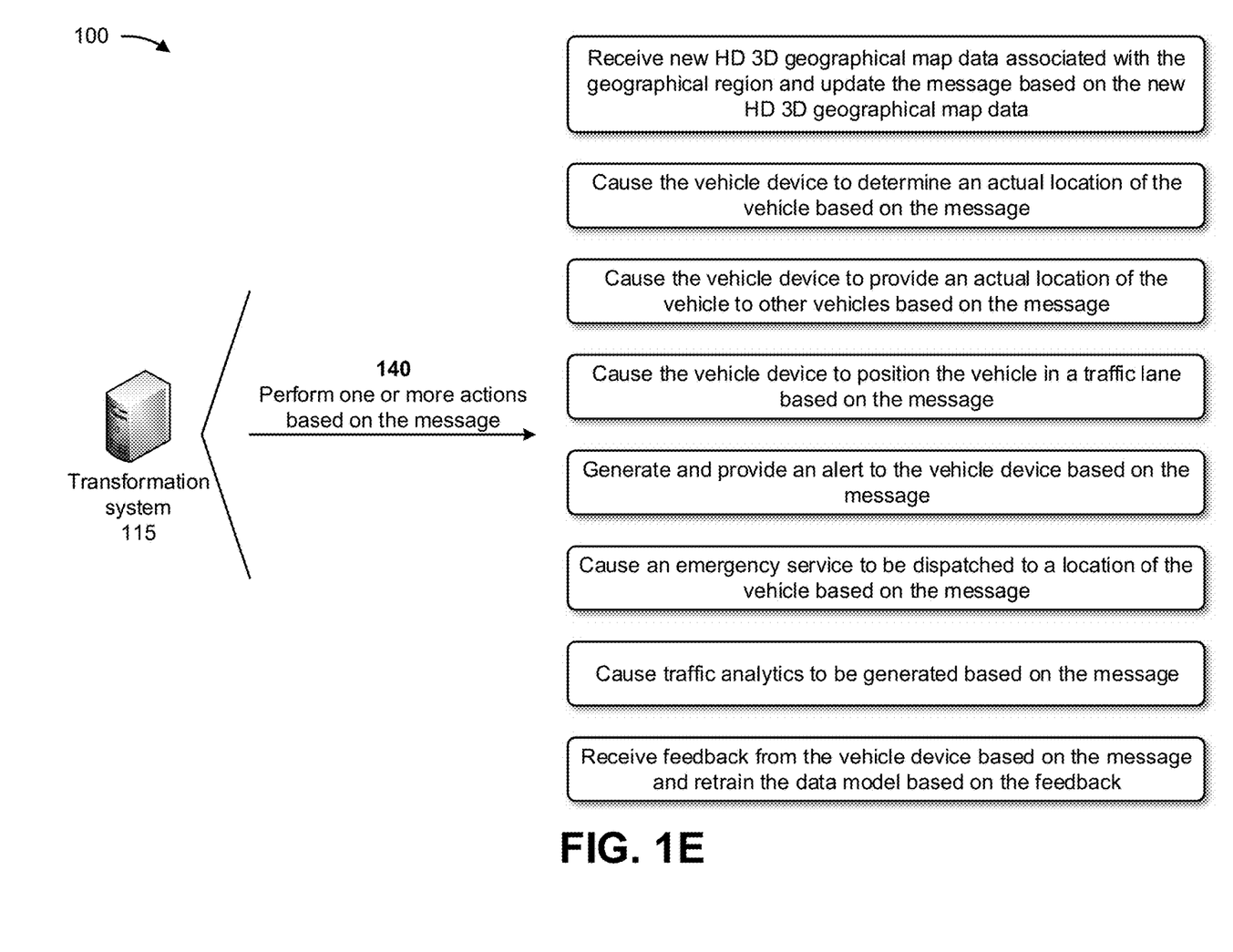

As shown in FIG. 1E, and by reference number 140, the transformation system 115 may perform one or more actions based on the message. In some implementations, the one or more actions include the transformation system 115 receiving new HD 3D geographical map data associated with the geographical region and updating the message based on the new HD 3D geographical map data. For example, the transformation system 115 may process the new HD 3D geographical map data, with the data model, to transform the new HD 3D geographical map data into new transformed geographical map data with a format that corresponds to the particular standard, as described above in connection with FIG. 1B. The transformation system 115 may update the message based on the new transformed geographical map data and may cause the updated message to be provided to the vehicle device 105 via the MEC device 110, the CV2X system, and/or the CV2X message broker. In this way, the transformation system 115 may conserve computing resources, networking resources, and other resources that would have otherwise been consumed by generating inaccurate geographical map data messages, handling traffic, emergency, and legal issues associated with providing the inaccurate geographical map data messages, and/or the like.

In some implementations, the one or more actions include the transformation system 115 causing the vehicle device 105 to determine an actual location of the vehicle based on the message. For example, the vehicle device 105 may utilize the message to determine an actual location of the vehicle in the geographical region. The actual location may be used by the vehicle in traversing the geographical region, avoiding traffic in the geographical region, finding a destination in the geographical region, avoiding other vehicles or pedestrians in the geographical region, and/or the like. In this way, the vehicle device 105 may conserve computing resources, networking resources, and other resources that would have otherwise been consumed by utilizing inaccurate geographical map data messages, waiting in traffic due to the inaccurate geographical map data messages, failing to navigate to a destination due to the inaccurate geographical map data messages, and/or the like.

In some implementations, the one or more actions include the transformation system 115 causing the vehicle device 105 to provide an actual location of the vehicle to other vehicles based on the message. For example, the vehicle device 105 may utilize the message to determine an actual location of the vehicle in the geographical region and to provide the actual location to other vehicles. The actual location of the vehicle may be used by the other vehicles in traversing the geographical region, avoiding traffic in the geographical region, avoiding the vehicle in the geographical region, and/or the like. In this way, the other vehicles may conserve computing resources, networking resources, and other resources that would have otherwise been consumed by utilizing inaccurate geographical map data messages, waiting in traffic due to the inaccurate geographical map data messages, colliding with the vehicle due to the inaccurate geographical map data messages, and/or the like.

In some implementations, the one or more actions include the transformation system 115 causing the vehicle device 105 to position the vehicle in a traffic lane based on the message. For example, the transformation system 115 may utilize the message to determine driving instructions for the vehicle in the traffic lane and may provide the driving instructions to the vehicle device 105. The vehicle device 105 may utilize the driving instructions to position the vehicle in the traffic lane. In this way, the vehicle device 105 may conserve computing resources, networking resources, and other resources that would have otherwise been consumed by utilizing inaccurate driving directions, waiting in traffic due to the inaccurate driving directions, failing to navigate to a destination due to the inaccurate driving directions, and/or the like.

In some implementations, the one or more actions include the transformation system 115 generating and providing an alert to the vehicle device 105 based on the message. For example, the transformation system 115 may utilize the message to determine that that the vehicle is in danger of a collision and may generate an alert about the danger of the collision. The transformation system 115 may provide the alert to the vehicle device 105, and the vehicle device 105 or a driver of the vehicle may avoid the collision based on the alert. In this way, the transformation system 115 may conserve computing resources, networking resources, and other resources that would have otherwise been consumed by generating inaccurate geographical map data messages, handling traffic, emergency, and legal issues associated with providing the inaccurate geographical map data messages, and/or the like.

In some implementations, the one or more actions include the transformation system 115 causing an emergency service to be dispatched to a location of the vehicle based on the message. For example, the transformation system 115 may utilize the message to determine that that the vehicle was involved in an accident and may generate a notification about the location of the vehicle based on the message. The transformation system 115 may provide the notification to an emergency service (e.g., police, an ambulance service, a fire department, and/or the like) so that emergency services may be dispatched to the location of the vehicle. In this way, the transformation system 115 may conserve computing resources, networking resources, and other resources that would have otherwise been consumed by generating inaccurate geographical map data messages, handling traffic, emergency, and legal issues associated with providing the inaccurate geographical map data messages, and/or the like.

In some implementations, the one or more actions include the transformation system 115 causing traffic analytics to be generated based on the message. For example, the transformation system 115 may generate traffic analytics (e.g., quantity of vehicles and/or pedestrians at an intersection, traffic issues, traffic signal issues, and/or the like) for the geographical region based on the message. The transformation system 115 may provide the traffic analytics to vehicles in the geographical region (e.g., for navigation and accident avoidance), to government agencies responsible for the geographical region (e.g., for traffic handling, traffic signal repair, road construction planning, and/or the like), and/or the like. In this way, the transformation system 115 may conserve computing resources, networking resources, and other resources that would have otherwise been consumed by generating inaccurate geographical map data messages, generating traffic analytics based on the inaccurate geographical map data messages, and/or the like.

In some implementations, the one or more actions include the transformation system 115 receiving feedback from the vehicle device 105 based on the message and retraining the data model based on the feedback. For example, the transformation system 115 may utilize the feedback as additional training data for retraining the data model, thereby increasing the quantity of training data available for training the data model. Accordingly, the transformation system 115 may conserve computing resources associated with identifying, obtaining, and/or generating historical data for training the data model relative to other systems for identifying, obtaining, and/or generating historical data for training data models.

As described above, the transformation system 115 may transform high-definition geographical map data into messages for vehicle communications. The transformation system 115 may iteratively evaluate the high-definition geographical map data and may process the results into the geographical map data message that can then be delivered to the MEC device 110 or via alternate distribution methods. The high-definition geographical map data may include highly discrete datasets with detailed information about lane boundaries, lane speed, lane type, lane intersections, right turn only indications, curb heights and locations, lane dividers, and/or the like. The transformation system 115 may transform geometries and information from various map layers, of the high-definition geographical map data, into a geographical map data message standard format (e.g., a flat message format).

Thus, the transformation system 115 may conserve computing resources, networking resources, and other resources that would have otherwise been consumed by retrieving the two-dimensional geographical map data and the two-dimensional aerial imagery, generating inaccurate geographical map data messages based on the two-dimensional geographical map data and the two-dimensional aerial imagery, handling traffic, emergency, and legal issues associated with providing the inaccurate geographical map data messages, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
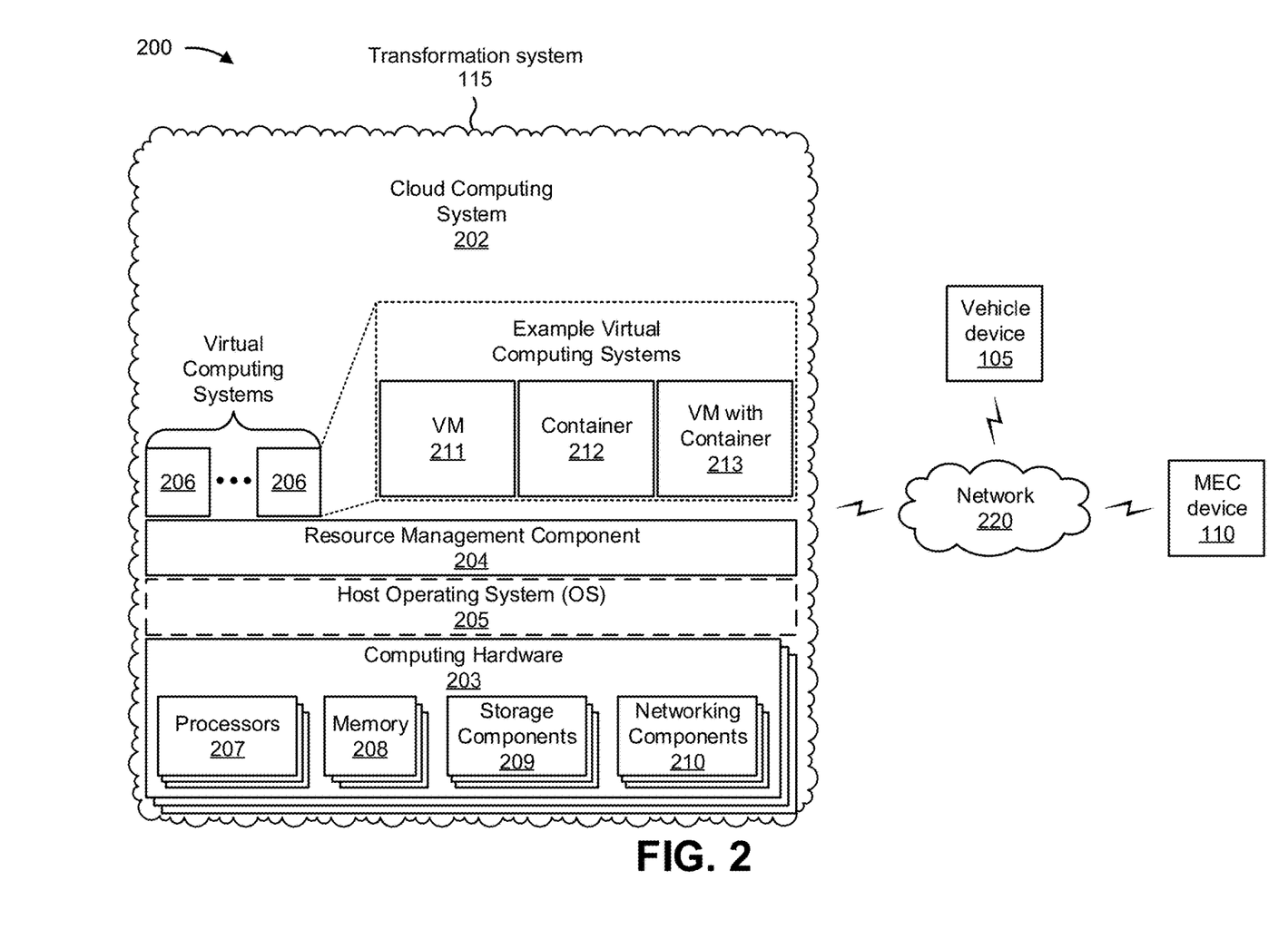
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the transformation system 115, which may include one or more elements of and/or may execute within a cloud computing system 202. The cloud computing system 202 may include one or more elements 203-213, as described in more detail below. As further shown in FIG. 2, environment 200 may include a network 220, the vehicle device 105, and/or the MEC device 110. Devices and/or elements of environment 200 may interconnect via wired connections and/or wireless connections.

The vehicle device 105 includes devices capable of receiving, generating, storing, processing, and/or providing information, as described elsewhere herein. The vehicle device 105 may include a communication device and/or a computing device. For example, the vehicle device 105 may include a telematics device, a video camera, a dashboard camera, an inertial measurement unit, a three-axis accelerometer, a gyroscope, a global positioning system (GPS) device, an on-board diagnostics (OBD) device, a vehicle tracking unit, an electronic control unit (ECU), an in-vehicle infotainment system, among other examples.

The MEC device 110 includes one or more devices capable of receiving, generating, storing, processing, providing, and/or routing information, as described elsewhere herein. The MEC device 110 may include a communication device and/or a computing device. For example, the MEC device 110 may include a device, such as an application device, a client device, a web device, a database device, a host device, a proxy device, a virtual device (e.g., executing on computing hardware), or a device in a cloud computing system. In some implementations, the MEC device 110 includes computing hardware used in a cloud computing environment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the transformation system 115 may include one or more elements 203-213 of the cloud computing system 202, may execute within the cloud computing system 202, and/or may be hosted within the cloud computing system 202, in some implementations, the transformation system 115 may not be cloud-based (e.g., may be implemented outside of a cloud computing system) or may be partially cloud-based. For example, the transformation system 115 may include one or more devices that are not part of the cloud computing system 202, such as device 300 of FIG. 3, which may include a standalone server or another type of computing device. The transformation system 115 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
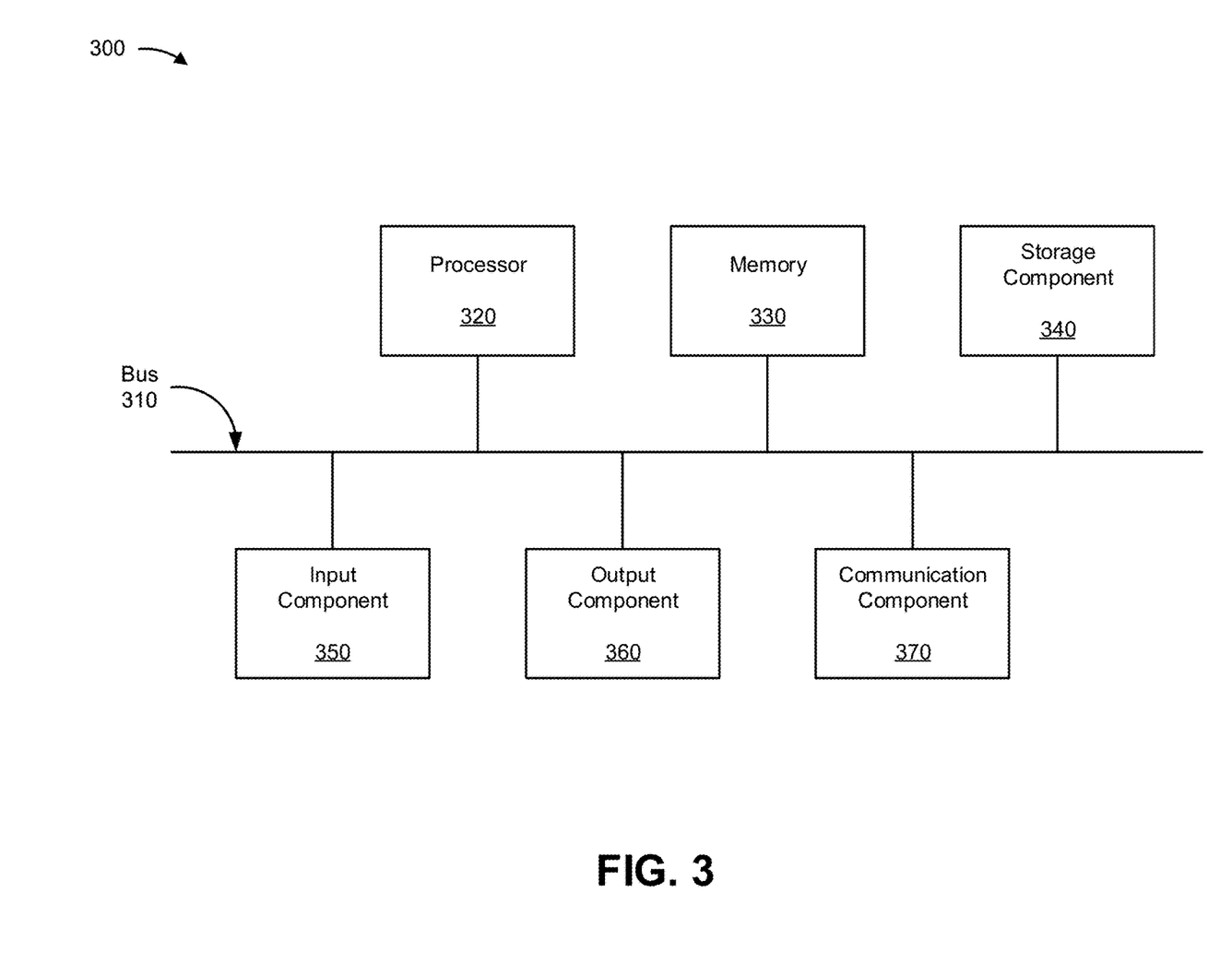
FIG. 3 is a diagram of example components of one or more devices of FIG. 2.

FIG. 3 is a diagram of example components of a device 300, which may correspond to the vehicle device 105, the MEC device 110, and/or the transformation system 115. In some implementations, the vehicle device 105, the MEC device 110, and/or the transformation system 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
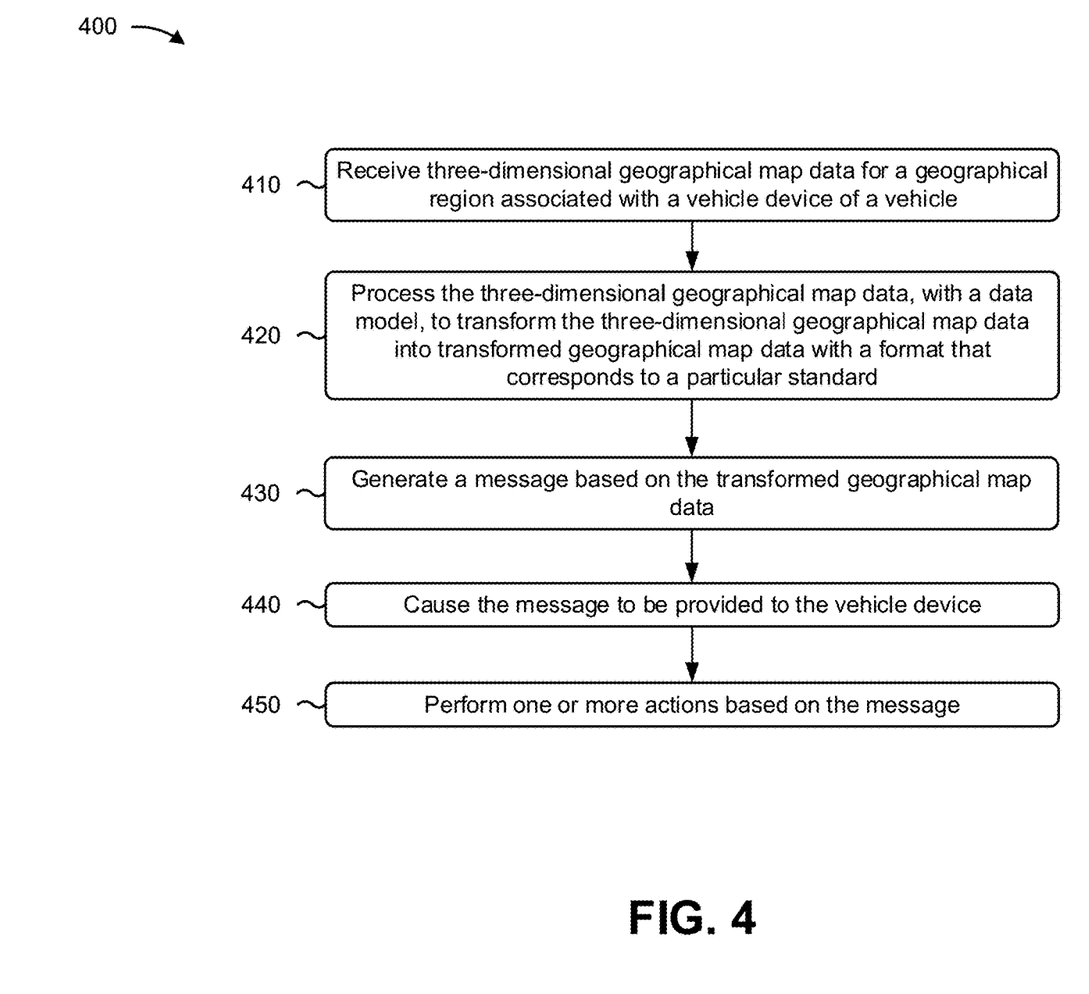
FIGS. 4 and 5 are flowcharts of an example process for transforming high-definition geographical map data into messages for vehicle communications.

FIG. 4 is a flowchart of an example process 400 for transforming high-definition geographical map data into messages for vehicle communications. In some implementations, one or more process blocks of FIG. 4 may be performed by a device (e.g., the transformation system 115). In some implementations, one or more process blocks of FIG. 4 may be performed by another device or a group of devices separate from or including the device, such as a vehicle device (e.g., the vehicle device 105) and/or an MEC device (e.g., the MEC device 110). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include receiving three-dimensional geographical map data for a geographical region associated with a vehicle device of a vehicle (block 410). For example, the device may receive three-dimensional geographical map data for a geographical region associated with a vehicle device of a vehicle, as described above. In some implementations, the three-dimensional geographical map data includes high-definition geographic information system three-dimensional data. In some implementations, the vehicle includes one or more of an autonomous robot, a semi-autonomous vehicle, an autonomous vehicle, or a non-autonomous vehicle.

As further shown in FIG. 4, process 400 may include processing the three-dimensional geographical map data, with a data model, to transform the three-dimensional geographical map data into transformed geographical map data with a format that corresponds to a particular standard (block 420). For example, the device may process the three-dimensional geographical map data, with a data model, to transform the three-dimensional geographical map data into transformed geographical map data with a format that corresponds to a particular standard, as described above. In some implementations, the particular standard includes a Society of Automotive Engineers J2735 standard.

In some implementations, processing the three-dimensional geographical map data, with the data model, to transform the three-dimensional geographical map data into the transformed geographical map data includes analyzing different layers of the three-dimensional geographical map data, identifying a portion of the three-dimensional geographical map data based on analyzing the different layers of the three-dimensional geographical map data, and transforming the portion of the three-dimensional geographical map data into the transformed geographical map data.

In some implementations, the transformed geographical map data includes map data identifying one or more of one or more traffic lanes associated with the geographical region, one or more intersections associated with the geographical region, one or more traffic signals associated with the geographical region, one or more sidewalks associated with the geographical region, or one or more pedestrian lanes associated with the geographical region.

As further shown in FIG. 4, process 400 may include generating a message based on the transformed geographical map data (block 430). For example, the device may generate a message based on the transformed geographical map data, as described above.

As further shown in FIG. 4, process 400 may include causing the message to be provided to the vehicle device (block 440). For example, the device may cause the message to be provided to the vehicle device, as described above. In some implementations, causing the message to be provided to the vehicle device includes one or more of causing the message to be provided to the vehicle device via a multi-access edge computing device associated with the vehicle device, causing the message to be provided to the vehicle device via a registration representational state transfer application program interface, or causing the message to be provided to the vehicle device via a cellular vehicle-to-everything message broker.

As further shown in FIG. 4, process 400 may include performing one or more actions based on the message (block 450). For example, the device may perform one or more actions based on the message, as described above. In some implementations, performing the one or more actions includes receiving new three-dimensional geographical map data associated with the geographical region, updating the message based on the new three-dimensional geographical map data and to generate an updated message, and causing the updated message to be provided to the vehicle device.

In some implementations, performing the one or more actions includes generating an alert based on the message and providing the alert to the vehicle device. In some implementations, performing the one or more actions includes determining a location of the vehicle based on the message and causing an emergency service to be dispatched to the location of the vehicle.

In some implementations, performing the one or more actions includes one or more of causing the vehicle device to determine an actual location of the vehicle based on the message, causing the vehicle device to provide an actual location of the vehicle to one or more other vehicles based on the message, causing the vehicle device to position the vehicle in a traffic lane based on the message, or causing traffic analytics for the geographical region to be generated based on the message.

Process 400 may include additional implementations, such as any single implementation or any combination of implementations described below and/or in connection with one or more other processes described elsewhere herein.

In some implementations, process 400 includes receiving feedback from the vehicle device based on the message and retraining the data model based on the feedback. In some implementations, process 400 includes calculating traffic analytics for the geographical region based on the message and providing the traffic analytics to an entity associated with managing traffic for the geographical region.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
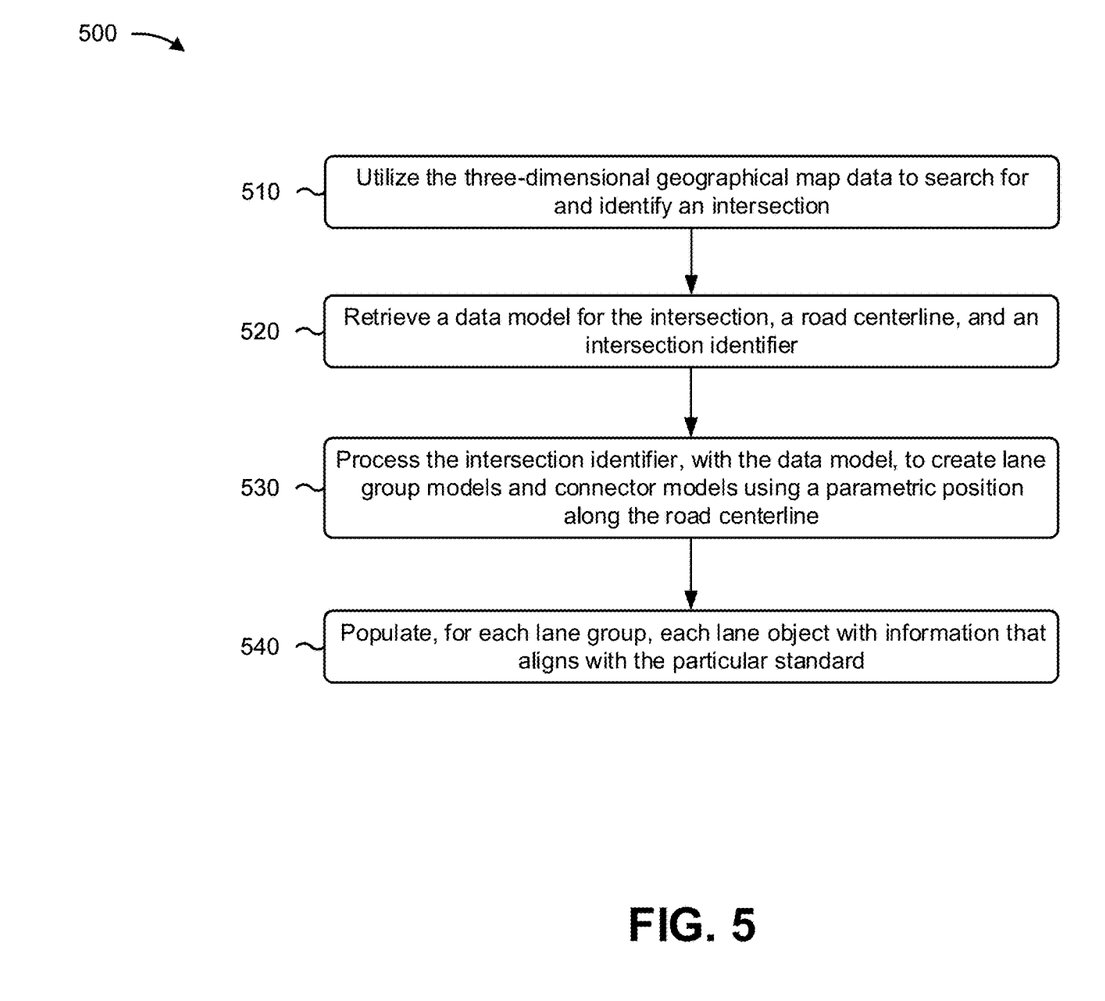

FIG. 5 is a flowchart of an example process 500 for processing the three-dimensional geographical map data, with a data model, to transform the three-dimensional geographical map data into transformed geographical map data with a format that corresponds to a particular standard (e.g., process block 420 of FIG. 4). In some implementations, one or more process blocks of FIG. 5 may be performed by a device (e.g., the transformation system 115). In some implementations, one or more process blocks of FIG. 5 may be performed by another device or a group of devices separate from or including the device, such as a vehicle device (e.g., the vehicle device 105) and/or an MEC device (e.g., the MEC device 110). Additionally, or alternatively, one or more process blocks of FIG. 5 may be performed by one or more components of the device 300, such as the processor 320, the memory 330, the storage component 340, the input component 350, the output component 360, and/or the communication component 370.

As shown in FIG. 5, process 500 may include utilizing the three-dimensional geographical map data to search for and identify an intersection (block 510). For example, the device may utilize the three-dimensional geographical map data to search for and identify an intersection, as described above.

As further shown in FIG. 5, process 500 may include retrieving a data model for the intersection, a road centerline, and an intersection identifier (block 520). For example, the device may retrieve a data model for the intersection, a road centerline, and an intersection identifier, as described above.

As further shown in FIG. 5, process 500 may include processing the intersection identifier, with the data model, to create lane group models and connector models using a parametric position along the road centerline (block 530). For example, the device may process the intersection identifier, with the data model, to create lane group models and connector models using a parametric position along the road centerline, as described above.

As further shown in FIG. 5, process 500 may include populating, for each lane group, each lane object with information that aligns with the particular standard (block 540). For example, the device may populate, for each lane group, each lane object with information that aligns with the particular standard, as described above.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, three-dimensional geographical map data for a geographical region associated with a vehicle device of a vehicle;
    processing, by the device, the three-dimensional geographical map data, with a data model, to:
        analyze different layers of the three-dimensional geographical map data,
        identify a portion of the three-dimensional geographical map data based on analyzing the different layers of the three-dimensional geographical map data, and
        transform the portion of the three-dimensional geographical map data into transformed geographical map data with a format that corresponds to a particular standard;
    generating, by the device, a message based on the transformed geographical map data;
    causing, by the device, the message to be provided to the vehicle device; and
    performing, by the device, one or more actions based on the message.

2. The method of claim 1, wherein the particular standard includes a Society of Automotive Engineers J2735 standard.

3. The method of claim 1, wherein causing the message to be provided to the vehicle device comprises one or more of:
    causing the message to be provided to the vehicle device via a multi-access edge computing device associated with the vehicle device;
    causing the message to be provided to the vehicle device via a registration representational state transfer application program interface; or
    causing the message to be provided to the vehicle device via a cellular vehicle-to-everything message broker.

4. The method of claim 1, wherein performing the one or more actions comprises:
    receiving new three-dimensional geographical map data associated with the geographical region;
    updating the message based on the new three-dimensional geographical map data and to generate an updated message; and
    causing the updated message to be provided to the vehicle device.

5. The method of claim 1, wherein performing the one or more actions comprises:
    generating an alert based on the message; and
    providing the alert to the vehicle device.

6. The method of claim 1, wherein performing the one or more actions comprises:
    determining a location of the vehicle based on the message; and
    causing an emergency service to be dispatched to the location of the vehicle.

7. The method of claim 1, wherein the transformed geographical map data includes map data identifying one or more of:
    one or more traffic lanes associated with the geographical region;
    one or more intersections associated with the geographical region;
    one or more traffic signals associated with the geographical region;
    one or more sidewalks associated with the geographical region; or
    one or more pedestrian lanes associated with the geographical region.

8. A device, comprising:
    one or more processors configured to:
        receive three-dimensional geographical map data for a geographical region associated with a vehicle device of a vehicle;
        process the three-dimensional geographical map data, with a data model, to:
            analyze different layers of the three-dimensional geographical map data,
            identify a portion of the three-dimensional geographical map data based on analyzing the different layers of the three-dimensional geographical map data, and
            transform the portion of the three-dimensional geographical map data into transformed geographical map data with a format that corresponds to a particular standard;
        generate a message based on the transformed geographical map data;
        cause the message to be provided to the vehicle device via a multi-access edge computing device associated with the vehicle device, via a registration representational state transfer application program interface, or via a cellular vehicle-to-everything message broker; and
        perform one or more actions based on the message.

9. The device of claim 8, wherein the one or more processors, to perform the one or more actions, are configured to:
receive feedback from the vehicle device based on the message; and
retrain the data model based on the feedback.

10. The device of claim 8, wherein the one or more processors, to perform the one or more actions, are configured to one or more of:
cause the vehicle device to determine an actual location of the vehicle based on the message;
cause the vehicle device to provide an actual location of the vehicle to one or more other vehicles based on the message;
cause the vehicle device to position the vehicle in a traffic lane based on the message; or
cause traffic analytics for the geographical region to be generated based on the message.

11. The device of claim 8, wherein the transformed geographical map data includes map data identifying one or more of:
one or more traffic lanes associated with the geographical region;
one or more intersections associated with the geographical region;
one or more traffic signals associated with the geographical region;
one or more sidewalks associated with the geographical region; or
one or more pedestrian lanes associated with the geographical region.

12. The device of claim 8, wherein the vehicle includes one or more of:
an autonomous robot,
a semi-autonomous vehicle,
an autonomous vehicle, or
a non-autonomous vehicle.

13. The device of claim 8, wherein the one or more processors, to perform the one or more actions, are configured to:
calculate traffic analytics for the geographical region based on the message; and
provide the traffic analytics to an entity associated with managing traffic for the geographical region.

14. The device of claim 8, wherein the one or more processors, to perform the one or more actions, are configured to:
receive new three-dimensional geographical map data associated with the geographical region; and
update the message based on the new three-dimensional geographical map data.

15. A non-transitory computer-readable medium storing a set of instructions, the set of instructions comprising:
one or more instructions that, when executed by one or more processors of a device, cause the device to:
receive three-dimensional geographical map data for a geographical region associated with a vehicle device of a vehicle;
process the three-dimensional geographical map data, with a data model, to:
analyze different layers of the three-dimensional geographical map data,
identify a portion of the three-dimensional geographical map data based on analyzing the different layers of the three-dimensional geographical map data, and
transform the portion of the three-dimensional geographical map data into transformed geographical map data with a format that corresponds to a particular standard;
generate a message based on the transformed geographical map data;
cause the message to be provided to the vehicle device; and
perform one or more actions based on the message.

16. The non-transitory computer-readable medium of claim 15, wherein the one or more instructions, that cause the device to perform the one or more actions, cause the device to:
receive new three-dimensional geographical map data associated with the geographical region;
update the message based on the new three-dimensional geographical map data and to generate an updated message;
cause the updated message to be provided to the vehicle device; and
perform one or more additional actions based on the updated message.

17. The non-transitory computer-readable medium of claim 15, wherein the one or more instructions, that cause the device to perform the one or more actions, cause the device to:
generate an alert based on the message; and
provide the alert to a vehicle located in the geographical region.

18. The non-transitory computer-readable medium of claim 15, wherein the one or more instructions, that cause the device to perform the one or more actions, cause the device to:
determine a location of a vehicle in the geographical region based on the message; and
cause an emergency service to be dispatched to the location of the vehicle.

19. The non-transitory computer-readable medium of claim 15, wherein the one or more instructions, that cause the device to perform the one or more actions, cause the device to:
calculate traffic analytics for the geographical region based on the message; and
provide the traffic analytics to an entity associated with managing traffic for the geographical region.

20. The non-transitory computer-readable medium of claim 15, wherein the transformed geographical map data includes map data identifying one or more of:
one or more traffic lanes associated with the geographical region;
one or more intersections associated with the geographical region;
one or more traffic signals associated with the geographical region;
one or more sidewalks associated with the geographical region; or
one or more pedestrian lanes associated with the geographical region.

* * * * *